(12) United States Patent
Estable

(10) Patent No.: US 9,363,306 B2
(45) Date of Patent: Jun. 7, 2016

(54) INTERNET PROTOCOL LOOPBACK WIRELESS DATA PROTOCOL CONVERTER

(75) Inventor: Luis Estable, Gatineau (CA)

(73) Assignee: BlackBerry Limited, Waterloo, CA (US)

( * ) Notice: Subject to any disclaimer, the term of this patent is extended or adjusted under 35 U.S.C. 154(b) by 2119 days.

(21) Appl. No.: 11/100,607

(22) Filed: Apr. 7, 2005

(65) Prior Publication Data

US 2006/0227808 A1   Oct. 12, 2006

(51) Int. Cl.
| | |
|---|---|
| *G06F 15/16* | (2006.01) |
| *H04L 29/08* | (2006.01) |
| *H04L 29/06* | (2006.01) |
| *H04W 80/00* | (2009.01) |

(52) U.S. Cl.
CPC ............. *H04L 67/04* (2013.01); *H04L 67/28* (2013.01); *H04L 67/289* (2013.01); *H04L 69/08* (2013.01); *H04L 67/2823* (2013.01); *H04W 80/00* (2013.01)

(58) Field of Classification Search
CPC ..... H04L 67/04; H04L 67/28; H04L 67/2823; H04L 67/289; H04W 80/00
USPC .................................. 709/230, 246
See application file for complete search history.

(56) References Cited

U.S. PATENT DOCUMENTS

| | | | |
|---|---|---|---|
| 6,119,161 A | 9/2000 | Lita et al. | |
| 6,961,330 B1 * | 11/2005 | Cattan et al. ................... | 370/352 |
| 7,346,649 B1 * | 3/2008 | Wong ............................. | 709/203 |
| 2002/0161928 A1 | 10/2002 | Ndili | |
| 2002/0184316 A1 * | 12/2002 | Thomas et al. ................ | 709/206 |
| 2003/0037261 A1 * | 2/2003 | Meffert et al. ................. | 713/201 |
| 2003/0050046 A1 * | 3/2003 | Conneely et al. .............. | 455/412 |
| 2003/0093565 A1 * | 5/2003 | Berger et al. ................... | 709/246 |
| 2003/0154313 A1 * | 8/2003 | Banerjee et al. ............... | 709/250 |
| 2003/0208608 A1 * | 11/2003 | Merriam ......................... | 709/229 |
| 2003/0231632 A1 * | 12/2003 | Haeberlen ................... | 370/395.5 |
| 2004/0039827 A1 * | 2/2004 | Thomas et al. ............... | 709/228 |
| 2004/0044792 A1 * | 3/2004 | Sjollema et al. .............. | 709/246 |
| 2004/0192312 A1 * | 9/2004 | Li et al. .......................... | 455/445 |

OTHER PUBLICATIONS

Symantec Corporation, Email settings are changed when Norton AntiVirus email protection is enabled; Internet, http://service1.symantec.com/SUPPORT/nav.nsf/pfdocs; Aug. 16, 2004.
Optimizing Wireless and Remote Data Communication: AcceleNet from ICT; AcceleNet White Paper rev 1.1; ICT 2002 Intelligent Compression Technologies, Inc.; May 1, 2002.
Canadian application No. 2,542,231, Office Action, dated Jan. 19, 2010.

* cited by examiner

*Primary Examiner* — Vivek Srivastava
*Assistant Examiner* — Normin Abedin
(74) *Attorney, Agent, or Firm* — Moffat & Co.

(57) ABSTRACT

An internet protocol loopback wireless data protocol converter apparatus for a mobile device is provided. The protocol converter apparatus includes at least one loopback interface; at least one internet protocol server operating on one or more ports of any of the at least one loopback interface; a wireless optimized data communications module to connect to a wireless data infrastructure to send and receive wireless optimized data; and at least one protocol converter unit to convert communications in a wireless optimized data protocol to and from standard internet protocol, wherein an internet protocol application can communicate with the at least one server using the loopback interface and data to and from the application can be received and transmitted using the wireless optimized data communications module with conversion by the at least one protocol converter unit.

19 Claims, 5 Drawing Sheets

INTERNET PROTOCOL LOOPBACK WIRELESS DATA PROTOCOL CONVERTER

FIELD OF THE APPLICATION

The present application provides an apparatus and method for converting wireless optimized data to and from "traditional" internet protocol services at a wireless data communication device, and specifically, the present application relates to an apparatus and method to enable "traditional" internet protocol applications to interoperate with wireless data optimized communication protocols automatically at a wireless data communications device without requiring the rewriting, recompiling, or otherwise customizing of the "traditional" internet protocol applications.

BACKGROUND

In the wireless technology field, collaborations occasionally occur between host device manufacturers and third party wireless optimized data connectivity service providers. In general, a host device may include a wireless optimized connectivity protocol stack in order to provide wireless optimized data services. Such services enable the host to communicate with wireless optimized data connectivity infrastructure. The wireless optimized data connectivity infrastructure itself may further communicate over wireless optimized and non-wireless optimized data protocols on behalf of the host device.

Certain problems, however, may arise when operating data communication applications on the host device. In one case, such communication applications may use a form of "traditional" internet protocol (IP) communications from the host device to connect it to the internet. This can cause problems as "traditional" internet protocol may be too chatty, expect low latency and thus timeout, expect high bandwidth and thus overload wireless resources, or otherwise expect continuous always-on connectivity and fail in out of coverage or low signal conditions. A known solution requires the host application to be "customised" in order to be aware of and effectively use the wireless optimized data connectivity protocols.

The customisation typically requires a wireless optimized data connectivity provider to disclose and educate the developers of the host applications to utilize the connectivity protocols.

The problem with the above is that the customisation of traditional IP software requires collaboration and development work and cannot be used automatically in the host. The host communications application needs to be rewritten and recompiled, restricting the range of software available to an end user and requiring effort on the host application developer's part.

DETAILED DESCRIPTION OF THE DRAWINGS

Figure 1:
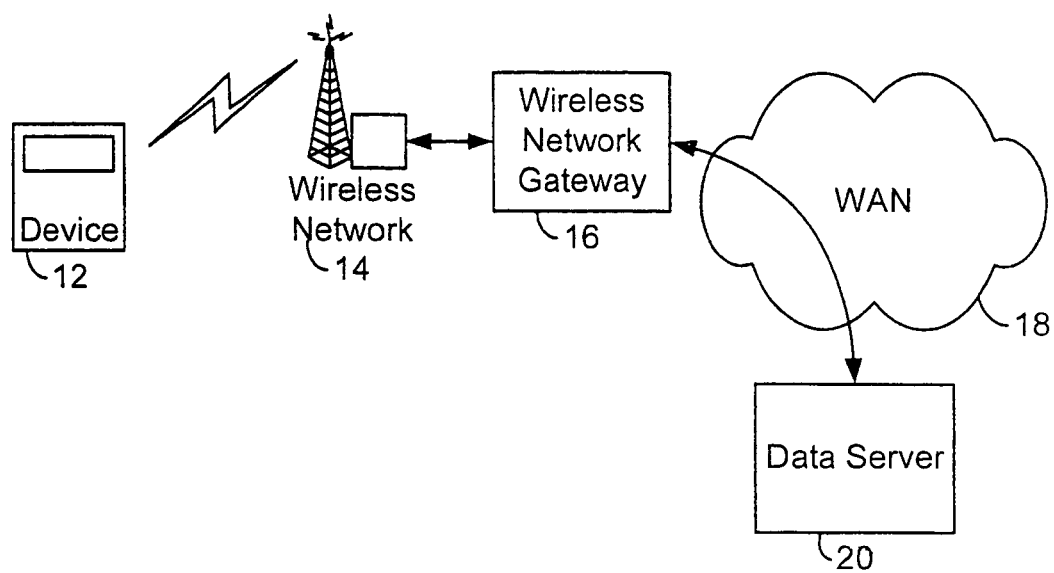
FIG. 1 is a simplified data path between a wireless data device and a data server.

The present application discloses an apparatus and method to overcome the deficiencies in the prior art by providing for the conversion of wireless data for hand-held IP protocol loopback services at a wireless data communications device. Specifically, the present application provides at least one loopback interface for an internet protocol call. Such a loopback interface would, preferably, use an address 127.0.0.N, where N is any number between 1 and 254. At least one server would be established on the wireless data device with the server operating on at least one port of the loopback interface.

Preferably, a wireless optimised data communication module is added to said wireless data device in order to connect to a wireless data infrastructure to send and receive wireless optimized data. Further, the wireless data device preferably includes at least one wireless optimised data protocol to "standard" IP protocol converter which couples the server and the wireless data communications module to convert communications to and from "standard" IP and wireless optimised data communication protocols.

In one example, a standard host application such as an email program could be configured on the wireless data device. When a user creates a new account on either POP3, IMAP or exchange, the server portion of the account configuration specifies the loopback address defined above. Afterwards, any emails sent or received will use these "standard" IP ports.

The above allows the host application to send and receive emails if the host application is an email application. One skilled in the art will appreciate that other types of applications can be used for standard IP. In the case of receiving an email, a wireless data device receives optimised data, converts it to, for example, POP3 data, optionally notifies the host application and either as a result of the notification or is independently due to the polling timer to check for email, the host application requests POP3 data on the loopback port and thus the email program receives an email.

Similarly, when sending an email message from the host application, the SMTP email data is sent through the configured port, where it is converted to wireless optimised data and sent over the wireless network.

Alternatives to the above could include setting various loopback interfaces for various functions including setting loopback interfaces for different email accounts or different interfaces for SMTP and for POP3.

In the case of an optimized communication protocol, the above provides the running of a server and protocol converter within the hand-held device itself which keeps wireless unfriendly and chatty "standard" IP protocols off the wireless network while still allowing any standard IP communication application to run.

The present application therefore provides an internet protocol loopback wireless data protocol converter for a mobile device comprising: at least one loopback interface; at least one internet protocol server operating on one or more ports of any of said at least one loopback interface; a wireless optimized data communications module to connect to a wireless data infrastructure to send and receive wireless optimized data; and at least one protocol converter to convert communications in a wireless optimized data protocol to and from standard internet protocol, wherein an internet protocol application can communicate with said at least one server using said loopback interface and data to and from said application can be received and transmitted using said wireless optimized data communications module with conversion by said at least one protocol converter.

The present application further provides a method of utilizing an internet protocol application on a mobile device having an optimized data communications module, a server on the mobile device and a protocol converter, the method comprising the steps of: configuring the internet protocol application to communicate using a loopback interface with the server; converting data coming from said server to said optimized data communications module using said protocol converter to a wireless optimized data protocol; and converting data from said optimized data communications module to said server using said protocol converter to an internet protocol.

Reference is now made to FIG. 1. FIG. 1 shows an exemplary and simplified architecture of a network including a wireless device 12, as is described in more detail below. Wireless device 12 communicates over an air interface with wireless network 14. Data sent from wireless device 12 over wireless network 14 proceeds through a wireless network gateway 16, through a wide area network 18, to a data server 20. As will be appreciated by those skilled in the art, various components and alternatives are available within a network architecture.

Figure 2:
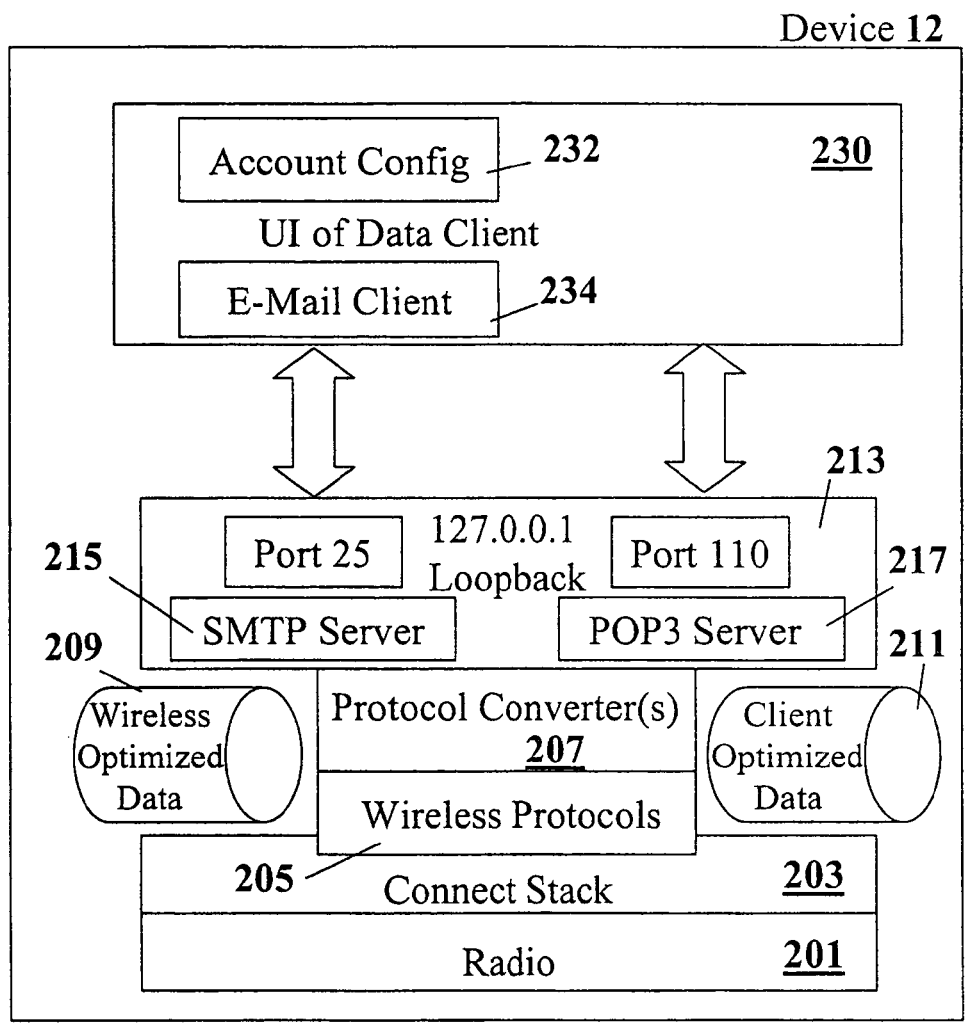
FIG. 2 is a block diagram of a wireless device showing various modules of the present method and apparatus.

Reference is made to FIG. 2. FIG. 2 shows an exemplary wireless device 12 according to the present system and method. A more detailed description of an exemplary wireless device on which the present system and method can be implemented is provided with reference to FIG. 5 below.

Device 12 includes a radio 201 for wireless communication with wireless network 14 as indicated in FIG. 1.

A connect stack 203 is used to provide connection between wireless protocols and the radio 201.

Wireless protocols 205 are standard protocols for use on the connectivity communication system. Such wireless protocols 205 are known in the art, and in the present case are preferably optimized for the wireless network.

The present system and method provide for protocol converters 207 in order to convert between host protocols and wireless protocols 205, and vice versa. By using protocol converters and wireless protocols for the connectivity device, "wireless unfriendly" and chatty "standard" Internet Protocol (IP) protocols (such as POP3 and SMTP) communications are advantageously kept off the wireless network. In other words, these protocols are contained within inter-process communications using the loopback interface as described below.

Wireless optimised data module 209 communicates with protocol converters 207 and can be used to store wireless optimized data. In one example, the wireless optimised data module 209 can be used to store data to implement size limitations for email messages that are being uploaded to the wireless data device. In this example, the wireless data device could require that only the first two kilobytes of an email message be uploaded at once, and if the user wants the remainder of the email message, then it can be uploaded at a later time. This prevents network congestion by limiting the size of transferred junk email messages or messages that the user is not interested in.

Other functions of optimised data module 209 could include adding identifiers for email trails, introducing various transport parameters, or other functions that would be apparent to those skilled in the art.

Client optimised data module 211 is used to support various standard protocols that a host application may expect. These could include, for example, Post Office Protocol 3 (POP3), Internet Message Access Protocol (IMAP), Simple Mail Transfer Protocol (SMTP), and client optimised data module 211 can optimise any message that is sent from such a host application or is being sent to a host application to provide integration of the host application onto the client environment.

Various servers can be implemented in a server module 213 and in the exemplary diagram of FIG. 2, an SMTP server 215 and a POP3 server 217 are shown. When an email message is sent it is received at a particular port, for example, port 25. This is the standard port for an SMTP server. SMTP server 215 monitors a particular address and in the present case the address is set to a loopback address. As will be appreciated by those skilled in the art, a loopback interface can be any address as designated by 127.0.0.N where N is any number between 1 and 254. For example, 127.0.0.1 is the loopback address illustrated in the exemplary diagram of FIG. 2. However, any of the other 254 addresses could be used.

Similarly, POP3 server 217 is used for receiving email messages using a particular port. For example, in the exemplary drawing of FIG. 2, port 110 is used for the POP3 server.

Host application 230 communicates using the loopback address with the various servers in server module 213. In the example of FIG. 2, host application 230 is an email client which includes account configuration module 232 to configure the address and port of the various servers serving the application 230. Further, the email client 234 is used for viewing and sending email messages.

Figure 3:
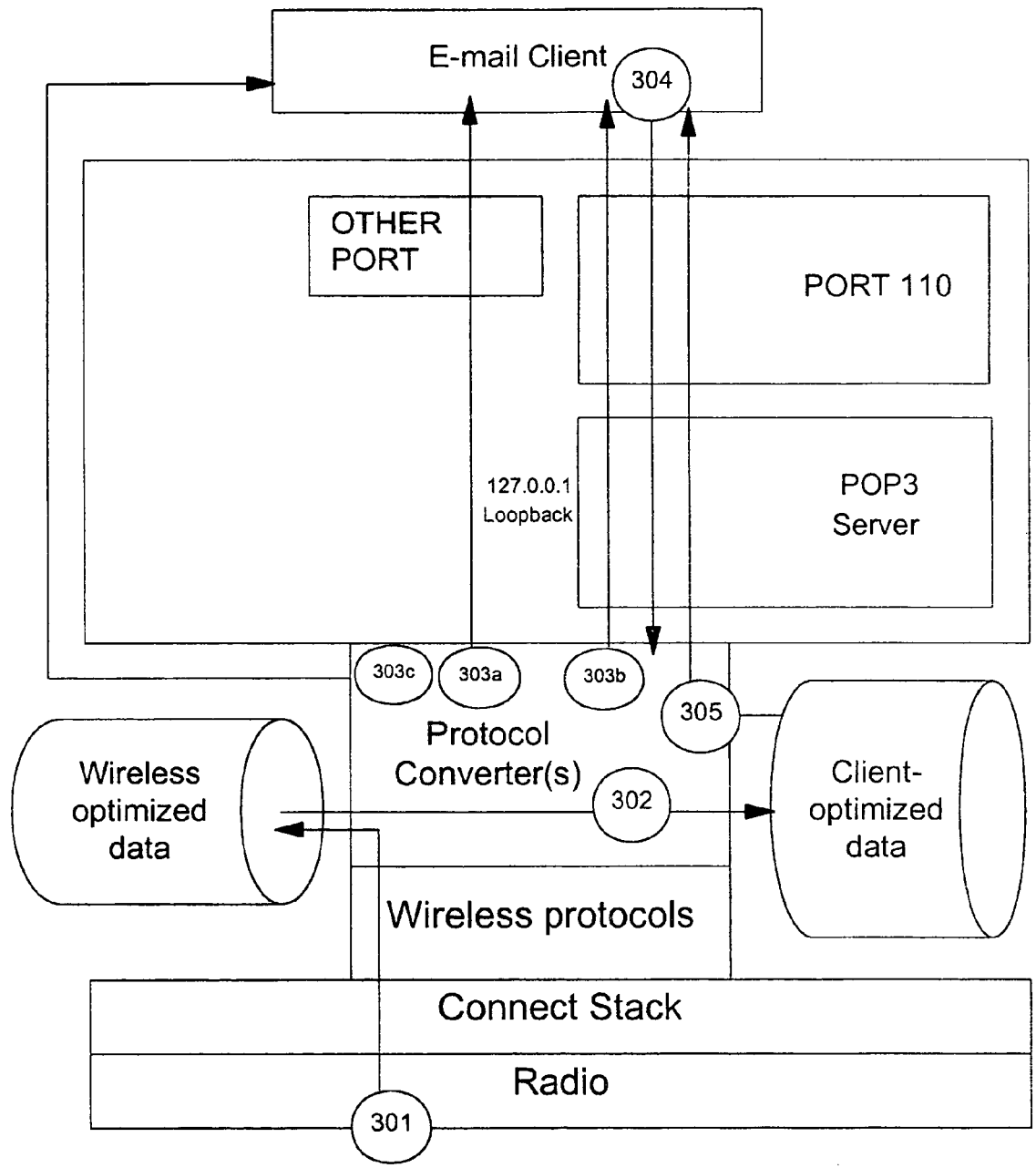
FIG. 3 is a block diagram showing the flow of data for an exemplary email client when a wireless data device receives an email message.

Reference is now made to FIG. 3. FIG. 3 shows an exemplary method of receiving an email message according to the present system and method. In step 301, wireless data device 12 receives wireless optimised data from wireless network 14. This wireless optimised data is sent through the connection stack 203, wireless protocols 205 to wireless optimised data module 209.

In step 302, the wireless optimised data is converted in protocol converter 207 to POP3 data. The POP3 data is then sent to client optimised data module 211.

Within protocol converter 207, a notify for email client 234 could be sent. This is, however, an optional step and is not necessarily required. In the example of FIG. 3, notify messages 303A, 303B, and 303C are illustrated as various options for notifications.

Notification 303A is a notification via a new "notify" loopback port. All clients 15 interested in data can listen to this port to see when new data has arrived. Further, more than one port could be used for the notification 303A, one for each type of data, and thus a client 15 can listen to only the ports for the data it is interested in. Notification 303A thus still uses an IP protocol.

Notification 303B is an improvement upon POP3 and adds vendor-specific "notify" features. Notify message 303B thus communicates through POP3 server and port 110 to notify email client 234 when a message arrives.

Notify message 303C uses another host-dependent mechanism such as an API callback to notify email client 234. No notification loopback or ports are therefore required based on this notify feature.

Referring to FIG. 3, either as a result of the optional notification 303A, 303B or 303C, or independently due to a polling timer set in email client 234, the email client requests POP3 data on loopback port 110. This is illustrated by step 304.

In step 305, as a result of the request of step 304, the POP3 server obtains the client optimised data, in this case POP3 data, and sends it to the email client.

Even though the email client is expecting the use of "standard" IP protocols in order to send and receive emails from email client 234, the system as described above advantageously shows the automatic use of wireless optimised protocols to receive an email message.

For the example of limiting email transfer sizes discussed above, it will be appreciated by those skilled in the art that message 304 could further be used to obtain additional portions of an email message. Thus, when a user has read the email message portion and wishes to obtain more of this email message, a request can be made in step 304 to receive more POP3 data for the same email message.

Figure 4:
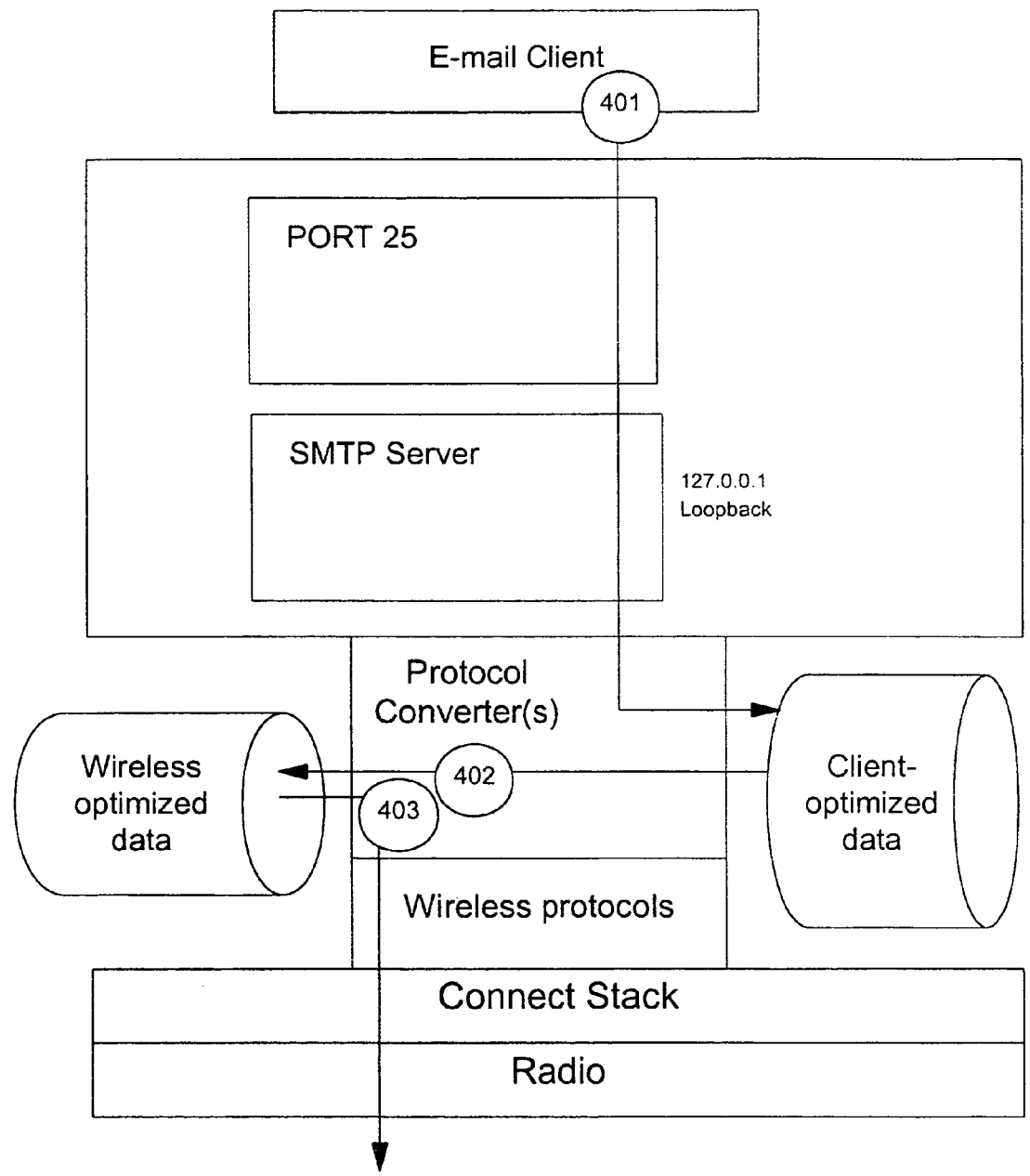
FIG. 4 is a block diagram of an exemplary email client showing steps for sending an email message.

Reference is now made to FIG. 4. FIG. 4 shows an exemplary diagram of the method that a user uses to send an email message from a host application over a wireless optimised network. In step 401, a user composes and sends an email message from email client 234. Email client 234 uses the settings in account configuration module 232 in order to send the message. In the present case, a loopback address is set and port 25 is specified for email messages sent.

Port 25 corresponds with SMTP server 215 which receives the email message and forwards it to client optimised data module 211. Client optimised data module 211, in step 402, sends the message through protocol converters to wireless optimised data module 209. This step converts the client optimised data into wireless optimised data and stores the data. This, for example, creates a more efficient message to send over the network, by for example replacing any forwarded or replied to email messages in an email body with a unique reference number for the forwarded or replied to email message Other optimizations are performed by the connect stack 203, such as retries, handling high latency, and out of coverage situations.

In step 403, the wireless optimised data module 209 sends the message through the wireless protocols, connection stack and radio 201 to wireless network 14 from which it proceeds to a data server 20 as described above with reference to FIG. 1.

The above is not meant to be limiting to an email client 234 but could be used for optimising any communication over a wireless network through the use of a loopback with a server on the wireless device and a protocol converter on the device. Examples could include telnet, instant messaging, http, rss, etc.

The above therefore provides a means for a host application to run on an optimised environment by providing a loopback and servers located on the wireless device. Various protocol converters could be used to optimise the data that travels over the network, resulting in better network utilisation and improved battery life on the wireless data device.

Further, by using standard interfaces, customisation to run on a wireless optimized enabled host environment is not required, which results in a wider selection of software available for the wireless data device since much of the software would instantly work "out of the box".

The present application has been described above with reference to email servers, such as POP3 and SMTP. However, other servers for other host applications would be known to those skilled in the art, such as those servers which provide any one of the services listed in the /etc/services file of a typical UNIX or LINUX based traditional IP communications capable computer system.

Figure 5:
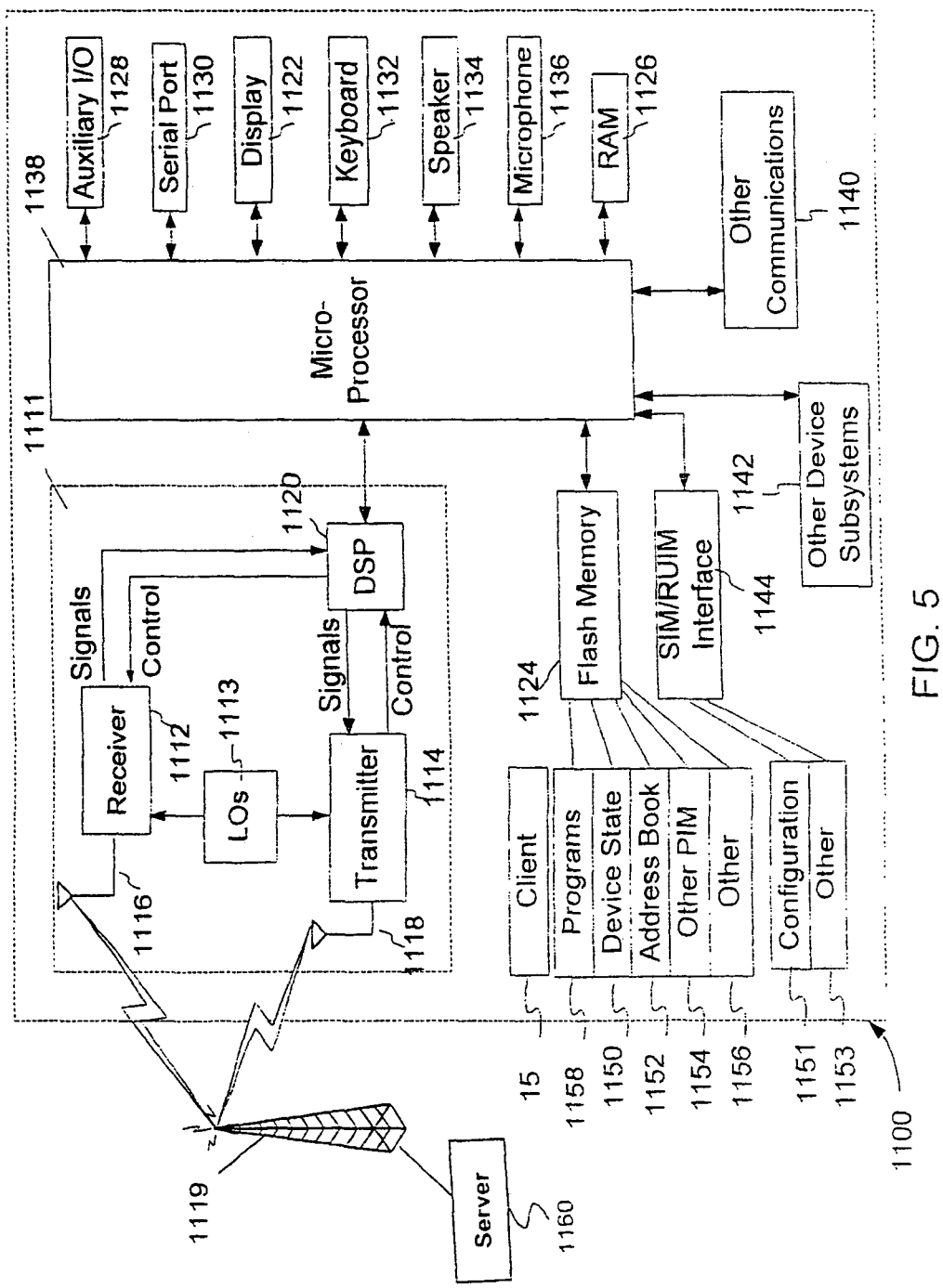
FIG. 5 is a block diagram of an exemplary wireless data device that could be used in association with the present method and apparatus.

Reference is now made to FIG. 5. FIG. 5 is a block diagram illustrating a host mobile station including preferred embodiments of the techniques of the present application. Mobile station 1100 is preferably a two-way wireless communication device having at least voice and data communication capabilities. Mobile station 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it will incorporate communication subsystem 1111, including both a receiver 1112 and a transmitter 1114, as well as associated components such as one or more, preferably embedded or internal, antenna elements 1116 and 1118, local oscillators (LOS) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile station 1100 may include a communication subsystem 1111 designed to operate within the MOBITEX™ mobile communication system, the DATATAC™ mobile communication system, GPRS network, UMTS network, 802.11 network, EDGE network or CDMA network.

Network access requirements will also vary depending upon the type of network 1119. For example, in the MOBITEX™ and DATATAC™ networks, mobile station 1100 is registered on the network using a unique identification number associated with each mobile station. In UMTS and GPRS networks, and in some CDMA networks, however, network access is associated with a subscriber or user of mobile station 1100. A GPRS mobile station therefore requires a subscriber identity module (SIM) card in order to operate on a GPRS network, and a RUN in order to operate on some CDMA networks. Without a valid SIM/RUIM card, a GPRS/UMTS/CDMA mobile station may not be fully functional. Local or non-network communication functions, as well as legally required functions (if any) such as emergency calling, may be available, but mobile station 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile station 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients 15 with various service levels.

Mobile station 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 5 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile station. A predetermined set of applications that control basic operations, including at least data and voice communication applications for example, will normally be installed on mobile station 1100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile station user's corresponding data items stored or associated with a host computer system. Further applications may also be loaded onto the mobile station 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile station 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile station 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile station 1100 is similar, except that received signals would preferably be output to a speaker 1134 and signals for transmission would be generated by a microphone 1136. Alternative voice or audio I/O subsystems, such as a voice message recording subsystem, may also be implemented on mobile station 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 5 would normally be implemented in a personal digital assistant (PDA)-type mobile station for which synchronization with a user's desktop computer (not shown) may be desirable. Such a port 1130 would enable a user to set preferences through an external device or software application and would extend the capabilities of mobile station 1100 by providing for information or software downloads to mobile station 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile station 1100 and different systems or devices, which need not necessarily be similar devices. For example, the subsystem 1140 may include an infrared device and associated circuits and components or a Bluetooth™ communication module to provide for communication with similarly enabled systems and devices.

The exemplary mobile station of FIG. 5 is meant to be illustrative and other devices with more or fewer features than the above could equally be used for the present method and apparatus.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

I claim:

1. A method of utilizing an internet protocol application on a mobile device having a wireless optimized data communications module configured to connect to a wireless data infrastructure, the method comprising:
   configuring the internet protocol application to communicate using a loopback interface with a server on the mobile device;
   converting internet protocol data coming from said server to said wireless optimized data communications module using a protocol converter unit on the mobile device to a wireless optimized data protocol;
   converting data from said wireless optimized data communications module to said server using said protocol converter unit on said mobile device to an internet protocol.

2. The method of claim 1, wherein the application is an email application and said at least one server is an email server selected from the group consisting of: a Post Office Protocol 3 (POP3) server, an Internet Message Access Protocol (IMAP) server, and a Simple Mail Transfer Protocol (SMTP) server.

3. The method of claim 2, wherein a loopback address is specified in a server portion of an account configuration.

4. The method of claim 2, including a plurality of loop back interfaces each corresponding to different email accounts.

5. The method of claim 1, wherein the notify step utilizes a notification module selected from the group consisting of: a loopback port notification module, a vendor specific notification module using said server, and a host-dependent notification module.

6. The method of claim 1 further comprising the step of optimizing data for a client application on said mobile device.

7. The method of claim 1, wherein the loopback interface has an address of the form 127.0.0.N, where N is between 1 and 254.

8. The method of claim 1, wherein the wireless optimised data module stores data for implementing a size limit for email messages.

9. The method of claim 1, said wireless optimised data module adding identifiers for email trails.

10. The method of claim 1, said wireless optimised data module providing transport parameters.

11. A mobile device, comprising:
   a communications subsystem;
   a processor;
   wherein the communication subsystem and the processor cooperate to implement an internet protocol loopback wireless data protocol converter, the internet protocol loopback wireless data protocol converter comprising:
      at least one loopback interface;
      at least one internet protocol server operating on one or more ports of said at least one loopback interface;
      a wireless optimized data communications module to connect to a wireless data infrastructure to send and receive wireless optimized data;
      at least one protocol conversion unit to convert communications from applications residing on the mobile device to a wireless optimized data protocol and to convert communications from an external application server to standard internet protocol;
      a wireless optimized data module communicating with said at least one protocol conversion unit, said wireless optimized data module storing wireless optimized data for said wireless data protocol.

12. The mobile device of claim 11, wherein a loopback address is specified in a server portion of ma account configuration.

13. The mobile device of claim 11, including a plurality of loop back interfaces each corresponding to different email accounts.

14. The mobile device of claim 11, wherein the wireless optimised data module stores data for implementing a size limit for email messages.

15. The mobile device of claim 11, said wireless optimised data module adding identifiers for email trails.

16. The mobile device of claim 11, said wireless optimised data module providing transport parameters.

17. The mobile device of claim 11, wherein the protocol converter further comprises a client optimized data module for storing data optimized for a client.

18. The mobile device of claim 11, wherein the loopback interface has an address of the form 127.0.0.N, where N is between 1 and 254.

19. The mobile device of claim 11, wherein the application is an email application and said at least one server is an email server selected from the group consisting of: a Post Office Protocol 3 (POP3) server, an Internet Message Access Protocol (IMAP) server, and a Simple Mail Transfer Protocol (SMTP) server.

* * * * *